UNITED STATES PATENT OFFICE.

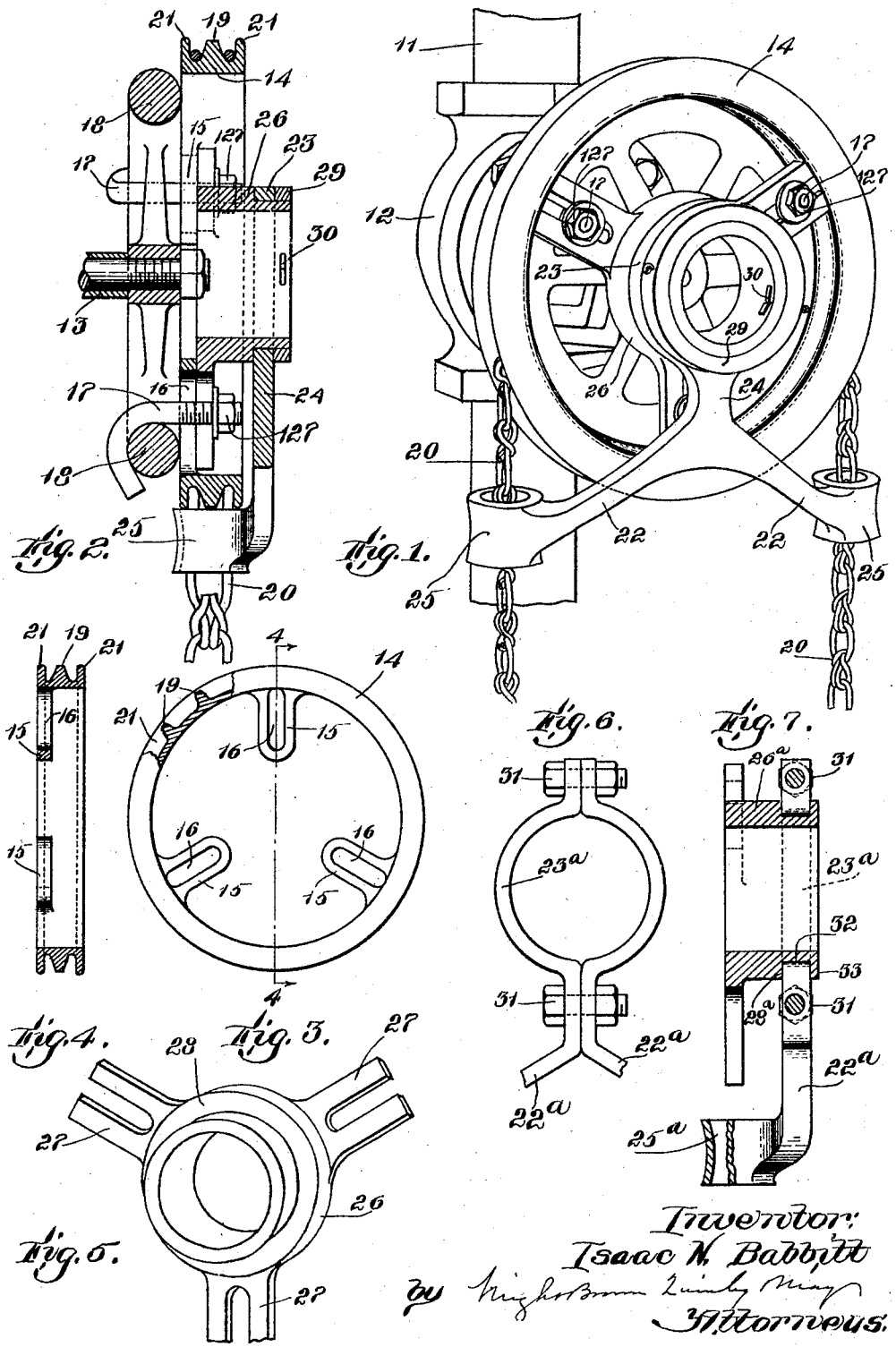

ISAAC N. BABBITT, OF FAIRHAVEN, MASSACHUSETTS.

SPROCKET-CHAIN GUIDE.

1,395,330.

Specification of Letters Patent.

Patented Nov. 1, 1921.

Application filed June 28, 1918. Serial No. 242,383.

*To all whom it may concern:*

Be it known that I, ISAAC N. BABBITT, a citizen of the United States, residing at Fairhaven, in the county of Bristol and State of Massachusetts, have invented new and useful Improvements in Sprocket-Chain Guides, of which the following is a specification.

The present invention has for its fundamental object to provide a guide for use in connection with a sprocket wheel or equivalent pulley and chain, rope or other flexible transmitter of power, in such relation as to guide the chain and make accidental slipping of the chain from the wheel impossible. The use for which the invention is particularly intended is in connection with a sprocket wheel or rim which is applied to a valve handle and is rotated by pulling of the chain so as either to open or close the valve, whereby to make possible the convenient operation of valves located in such inaccessible positions that they can not easily be reached for hand operation by the attendant whose duty it is to regulate them. It some times happens that, due to the valve being placed with its hand wheel in other than the vertical plane, or to careless manipulation of the chain, the chains applied for this and analogous purposes will climb over or slip off from and leave the rim of the sprocket wheel, thus making necessary the more or less difficult operation of returning the chain to its proper position. The difficulty of doing this in rooms and chambers where there are pipe lines equipped with valves high overhead, or where valves are more or less obstructed by adjacent pipe lines, may be very great indeed. The utility of the present invention thus consists in the fact that by preventing the chain from leaving the sprocket, it not only avoids the necessity of restoring the chain to a location which is more or less difficult of access, but, and this may be of vastly greater importance, avoids danger of the chain leaving the sprocket at a time when perhaps the safety of persons or property may depend on the quick and certain closing or opening of a valve in an inaccessible position.

In such a case, the slipping of the chain from the sprocket applied to a valve wheel during the act of opening or closing the valve might conceivably be the cause of a fatal accident.

I have designed the embodiment of the present invention which I will presently describe, for use in connection with a sprocket attachment for valve handles patented by me August 31, 1915, No. 1,151,749, and I claim as part of my invention the features of this chain guide which adapt it for use in combination with such sprocket attachment, as well as the combination of the guide with said attachment. However the broader aspects of the invention are not limited to this particular use and combination, but are applicable to all sorts of sprocket and chain drives, and equivalent pulley and flexible cable power transmission couple, wherefore I claim also all novel characteristics of my improved chain guide which are adapted for general use.

I have chosen to illustrate the embodiment of the invention which is particularly designed for use with a sprocket attachment of the sort above mentioned, and I will describe the same in detail in the following specification, without intending thereby to limit the scope of the protection which I claim otherwise than as above indicated.

Referring to the drawings, Figure 1 is a perspective view showing my chain guide in connection with a sprocket attachment applied to the handle or hand wheel of a valve. Fig. 2 is a vertical central section of the same and of the valve wheel. Figs. 3 and 4 are respectively an elevation and a central cross section of the sprocket wheel rim shown in the preceding figures. Fig. 5 is a perspective view of the hub or sleeve forming a part of my new guide attachment. Fig. 6 is a front elevation showing a modification in the structure of the chain guide. Fig. 7 is a central section showing said modification applied to the support or hub whereon it is mounted.

Like reference characters designate the same parts in all the figures wherever they occur.

Referring to the drawings 11 represents a pipe line and 12 represents the casing of a valve interposed in such line, said valve being of the familiar globe type which has a projecting stem and a handle in the form of a wheel for moving the same endwise so as to open and close the valve. Such stems are commonly operable in one of two ways, either by being rigidly secured to the hand wheel and threaded into a part of the casing, whereby upon rotation they are moved in and out, or by being threaded through the hand wheel and being otherwise prevented from rotation, the hand wheel being then rotatable about the stem and acting as a nut to move it endwise. The present illustration represents in Fig. 2 a valve stem 13 which is of the type first described and on which the hand wheel is secured immovably by a nut.

The sprocket consists of the rim 14 and substantially radial lugs 15 having slots 16 adapted to receive the shanks of hooks 17 which pass around the rim or the spokes of the valve handle wheel 18, in essentially the manner disclosed in my prior patent aforesaid. On the periphery of the sprocket rim are teeth 19 to engage the links of the operating chain 20, and flanges 21, 21 to confine the chain. This sprocket rim may be made with a flange or web instead of lugs to contain the slots, and such flange, web or lugs may be arranged to extend either toward the axis of the sprocket, or outwardly from the rim, or both inwardly and outwardly, in order to adapt the same sized attachment to valve wheels of many various diameters. So far as that aspect to the invention which has reference to the general use of the chain guide is concerned, said sprocket may be considered as typical of a sprocket wheel or wheel rim of any type adapted for any purpose whatever.

The guide with which my present invention is particularly concerned, consists of a pair of arms 22, 22 which are connected to a collar 23 through a common neck 24, and carry at their ends guiding eyes or sleeves 25, 25 which are offset into the plane of the sprocket rim, and the axes of which are in lines approximately tangent to the pitch circle of the sprocket. In other words, these eyes are so located that a chain passing through them and around the sprocket is guided to pass to and from the latter in the path proper to cause it to engage the teeth and to prevent its climbing or slipping over either guarding flange.

The collar of this guard is supported by a tubular hub or sleeve 26 which is equipped with slotted arms 27 by which it is attached to the sprocket. When designed for the combination here illustrated, the slotted arms 27 are spaced conformably to the lugs 15 of the sprocket rim so that their slots register with the slots 16, and the shanks of the same attaching hooks pass through both slots, and the hub is thus secured in place by the nuts 127 on such shanks. That part of the tubular hub which supports the collar of the guide is reduced in diameter, whereby it provides a shoulder 28 against which the collar abuts; and this reduced part forms a bearing for the collar on which the latter is adapted to turn freely. It is retained by a ring 29 fitting freely upon the hub extension and secured thereon by cotter pins 30 passing through both the ring and extension, substantially as shown in Figs. 1 and 2.

Thus the chain guide is so mounted that it will remain in substantially the same position under the draft of the chain, while the sprocket turns, the hub 26, of course, turning with the sprocket.

The guide thus described is made in one piece, preferably as a casting of metal, but I may construct equivalent guides in a great many other ways and out of other materials. One other mode of construction is shown in Figs. 6 and 7, where the guide is made in two parts out of malleable cast iron, or forged iron or steel. The two arms 22ª, 22ª carry eyes 25ª and are disposed substantially as already described and as shown in Figs. 1 and 2, but the collar 23ª is formed by the combination of the opposite semi-circularly curved parts of the two arms. Upon being secured together by bolts 31, the parts last described form a complete collar as shown in Fig. 6. This collar may be mounted upon a modified form of hub 26ª having a groove or channel 32 to receive it, such channel being bounded by integral shoulders 28ª and 33. The latter shoulder takes the place of the removable retaining ring 29, and its use is made possible from the fact that the collar portion of the guide is constructed of two separable parts.

The sprocket rim and chain guide may be mounted in any plane, either vertical, horizontal, or inclined. When in the vertical plane the guide prevents the chain from being displaced from the sprocket by careless handling, and when in the horizontal or an inclined plane it prevents the chain from falling off under the influence of gravity. Thus the guide enables the sprocket attachment to be applied to valves such as those of which the hand wheels are in horizontal or inclined planes; and in ships, where the rolling of the vessel is liable to shift the plane of even a vertical hand wheel so far that an unguided chain would not be secure. No matter how far out of line or how slack the chain may be at the side of the guide away from the wheel, it can not escape the eyes of the guide, and the latter compel it to follow the path in approaching the wheel which insures unfailing entrance of the chain into the channel between the flanges and into engagement with the sprocket teeth.

The reason for making the hub 26 as a tubular member is not only to economize material while furnishing a bearing of large diameter, but also to provide a passageway through which a stem of the sort previously described which moves through the hand wheel when the latter is rotated, may pass. Such a stem, commonly known as a rising stem, may move outward across the plane of the sprocket as far as may be necessary for fully opening and fully closing the valve, without obstruction from any part of the device. For the purposes of the broader phases of my claim, it is not material whether or not the hub is separate from or integral with the sprocket, or whether it is of larger or smaller diameter. The principal feature in the broad sense is that said hub provides, in combination with the sprocket, a bearing on which the guide is mounted and between which and the guide there is provision for relative rotative motion, whereby the chain may remain in substantially the same location, and operate in substantially the same path, while the sprocket rotates.

This invention of course is adapted to be used with sprocket wheels and chains of any specific character regardless of the peculiarities in detail of the chain links and the chain-engaging parts of the wheel. The particular chain shown for illustration is one in which the links are of wire doubled to make a loop with the ends of each link passed through the loop of the next and bent back upon themselves.

What I claim and desire to secure by Letters Patent is:

1. The combination with a sprocket of a bearing associated with said sprocket and located within the circumference of its rim, a chain guide having a portion rotatably mounted on said bearing and having eyes adapted to receive the stretches of a chain passing around the sprocket and located in position to direct that stretch which approaches the sprocket during the rotation of the latter into proper engagement with its rim, and means for detachably connecting said sprocket and bearing to a valve handle.

2. The combination with a sprocket of a bearing associated with said sprocket inside of the rim thereof, a chain guide comprising a collar, fitting upon said bearing, arms, and chain guiding eyes carried by said arms, the collar, arms, and eyes being all parts of a rigid unit structure rotatable about the bearing, said sprocket and hub being detachably attachable to a valve handle, and means for so attaching them.

3. The combination with a sprocket, of a tubular bearing connected thereto in a position where the axial line of the sprocket is within its bore, and a chain guide rotatably mounted upon said bearing and having eyes located outside of the periphery of the sprocket and substantially in the plane thereof adapted to guide a chain.

4. The combination with a sprocket wheel of a hub associated with said wheel and having a bearing portion, said hub being tubular and arranged with its bore including the axial line of said sprocket wheel, a guide having a collar mounted rotatably on said bearing portion, arms springing from the collar at one side thereof and branching from one another, each extending across the rim of the wheel, and chain-guiding eyes on the ends of said arms offset into the plane of the wheel rim and located in lines substantially tangent to the same.

5. The combination with a sprocket rim having inwardly projecting lugs, of a hub having arms arranged to register with said lugs, means for mounting said rim and hub in association with one another, a chain passing around said sprocket rim, and a guide journaled upon said hub and having eyes arranged in the plane of said rim, being constructed to admit the stretches of the chain, and located so near said rim as to guide the chain unerringly into proper engagement with the rim.

6. The combination with a sprocket rim having slotted lugs for connection with a valve wheel, hooks for connecting the same to such wheel having shanks passing through said lugs, and nuts threaded on the shanks, of a hub having slotted arms arranged to be placed in registry with said lugs and to receive said shanks and to be pressed upon by said nuts, said hub having a bearing, and a guide journaled upon said bearing and carrying chain-guiding eyes offset into the plane of said sprocket rim and occupying positions near to the latter in lines tangent thereto.

7. The combination with a tubular hub having externally projecting slotted arms, of a collar rotatably mounted on said hub, arms connected to said collar and projecting therefrom, eyes on the outer ends of said hub and means for detachably mounting said hub upon a sprocket, the eyes being offset from the plane of said arms sufficiently to bring them into the plane of said sprocket when the hub is thus attached to the latter.

8. The combination with a valve handle of a sprocket wheel rim, a bearing hub, and a chain guide, said sprocket rim and hub being detachably attachable to the valve handle, and means for so attaching them to said handle, the chain guide having a part journaled upon said hub and having separated chain-guiding eyes adjacent to the outer circumference of said sprocket and in approximately the plane of the chain-receiving part thereof.

9. An attachment for a valve hand wheel and similar purposes, comprising a rim adapted for a chain, rope, or equivalent flexible transmitter of force, a bearing member, and a guide having a collar portion fitting rotatably on said bearing member and having separated chain-guiding passages; the rim and bearing member having means for assemblage in substantially coaxial relation with each other, and said guiding passages being substantially in the plane of the rim where such assemblage is effected.

10. A chain guiding attachment for the purpose specified, comprising a bearing member having means for attaching it to a wheel which is adapted to a chain or equivalent flexible transmitter of force, and a guide member rotatably fitted to said bearing member and having diverging arms and eyes carried by said arms.

11. A chain guiding attachment for a sprocket and chain or equivalent power transmission couple comprising a tubular hub having outwardly extending slotted portions adapted for attachment to a wheel, and a guide member having a collar rotatably fitted to said hub and diverging arms springing from said collar and guiding eyes upon said arms.

In testimony whereof I have affixed my signature.

ISAAC N. BABBITT.